United States Patent
Oh et al.

(10) Patent No.: US 10,850,886 B2
(45) Date of Patent: Dec. 1, 2020

(54) REAR HOLDER AND MOTOR COMPRISING SAME

(71) Applicant: LG INNOTEK CO., LTD., Seoul (KR)

(72) Inventors: Chung Jae Oh, Seoul (KR); Shung Hun Woo, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 126 days.

(21) Appl. No.: 16/322,813

(22) PCT Filed: Aug. 1, 2017

(86) PCT No.: PCT/KR2017/008313
§ 371 (c)(1),
(2) Date: Feb. 1, 2019

(87) PCT Pub. No.: WO2018/026177
PCT Pub. Date: Feb. 8, 2018

(65) Prior Publication Data
US 2019/0202591 A1  Jul. 4, 2019

(30) Foreign Application Priority Data

| Aug. 1, 2016 | (KR) | 10-2016-0098211 |
| Jan. 4, 2017 | (KR) | 10-2017-0001349 |
| May 2, 2017 | (KR) | 10-2017-0056355 |

(51) Int. Cl.
*H02K 11/00* (2016.01)
*B65D 5/04* (2006.01)
(Continued)

(52) U.S. Cl.
CPC ............ *B65D 5/04* (2013.01); *H01R 13/5213* (2013.01); *H01R 13/5812* (2013.01);
(Continued)

(58) Field of Classification Search
CPC ...... H02K 5/225; H02K 2203/09; H02K 3/50; H02K 2203/06; H02K 2203/03; H02K 3/38; H01R 13/5213; H01R 13/5812
(Continued)

(56) References Cited

U.S. PATENT DOCUMENTS 4,690,478 A * 9/1987 Rahrig ............... H01R 13/521
439/271
5,773,758 A 6/1998 Coutureau et al.
(Continued)

FOREIGN PATENT DOCUMENTS

| CN | 101040408 A | 9/2007 |
| CN | 203118538 U | 8/2013 |
(Continued)

OTHER PUBLICATIONS

Office Action dated May 8, 2020 in Chinese Application No. 201780048461.8.
(Continued)

*Primary Examiner* — Thanh Lam
(74) *Attorney, Agent, or Firm* — Saliwanchik, Lloyd & Eisenschenk

(57) ABSTRACT

The present invention may provide a rear holder comprising: a first body comprising a first groove; a second body comprising a second groove; a coupling portion for coupling the first body and the second body such that the first groove and the second groove are aligned, thereby constituting a cable hole; and a rib, wherein the rib is arranged so as to protrude along at least one selected from the boundary between the front surface of the first body and the first groove and the boundary between the front surface of the second body and the second groove.

12 Claims, 16 Drawing Sheets

(51) Int. Cl.
*H01R 13/64* (2006.01)
*H02K 5/22* (2006.01)
*H01R 13/58* (2006.01)
*H02K 11/40* (2016.01)
*H01R 13/52* (2006.01)
*H02K 3/32* (2006.01)
*H02K 11/22* (2016.01)

(52) U.S. Cl.
CPC .............. *H01R 13/64* (2013.01); *H02K 3/32* (2013.01); *H02K 5/225* (2013.01); *H02K 11/022* (2013.01); *H02K 11/40* (2016.01); *H02K 2213/03* (2013.01)

(58) Field of Classification Search
USPC .............................................. 310/71; 439/851
See application file for complete search history.

(56) References Cited

U.S. PATENT DOCUMENTS

| | | | |
|---|---|---|---|
| 5,801,465 A | 9/1998 | Yamada | |
| 7,901,239 B2 | 3/2011 | Weber | |
| 8,002,572 B2* | 8/2011 | Lu | H01R 13/6592 439/405 |
| 8,449,329 B1* | 5/2013 | Schroll | H01R 13/6586 439/607.05 |
| 2006/0121797 A1* | 6/2006 | Casses | H01R 13/113 439/851 |
| 2007/0275591 A1 | 11/2007 | Weber | |
| 2012/0217828 A1* | 8/2012 | Takei | G01P 1/026 310/71 |
| 2013/0057095 A1* | 3/2013 | Okinaga | H02K 3/522 310/71 |
| 2017/0317567 A1* | 11/2017 | Cho | H02K 7/14 |

FOREIGN PATENT DOCUMENTS

| | | |
|---|---|---|
| JP | 2002-118947 A | 4/2002 |
| JP | 3758104 B2 | 3/2006 |
| JP | 2011-211876 A | 10/2011 |
| JP | 2015-125889 A | 7/2015 |
| JP | 2016-084768 A | 5/2016 |
| WO | WO-2015/099183 A1 | 7/2015 |

OTHER PUBLICATIONS

Office Action dated May 4, 2020 in European Application No. 17 837 228.0.

Supplementary European Search Report dated Jul. 10, 2019 in European Application No. 17837228.0.

International Search Report in International Application No. PCT/KR2017/008313, filed Aug. 1, 2017.

* cited by examiner

Fig. 10
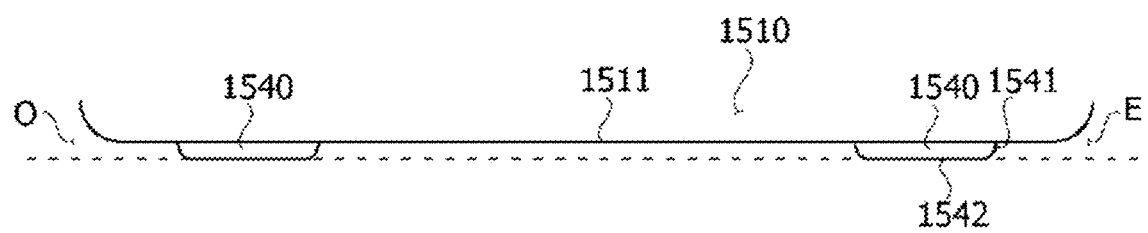
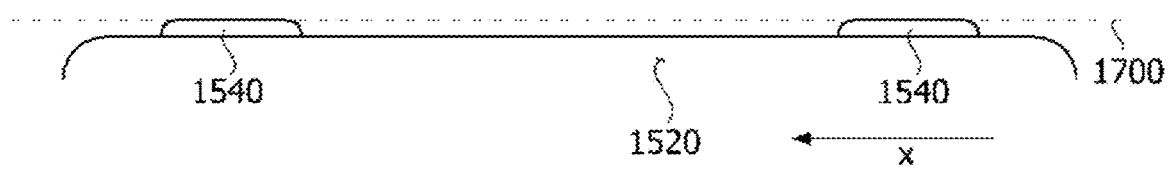

REAR HOLDER AND MOTOR COMPRISING SAME

CROSS-REFERENCE TO RELATED APPLICATIONS

This application is the U.S. national stage application of International Patent Application No. PCT/KR2017/008313, filed Aug. 1, 2017; which claims the benefit under 35 U.S.C. § 119 of Korean Application Nos. 10-2016-0098211, filed Aug. 1, 2016; 10-2017-0001349, filed Jan. 4, 2017; and 10-2017-0056355, filed May 2, 2017; the disclosures of each of which are incorporated herein by reference in their entirety.

TECHNICAL FIELD

The present invention relates to a rear holder and a motor including the same.

BACKGROUND ART

An electronic power steering (EPS) apparatus is an apparatus configured to allow a driver to safely drive by ensuring turning stability of a vehicle and providing a quick restoring force of the vehicle. The EPS apparatus controls driving of a steering shaft of the vehicle by driving a motor through an electronic control unit (ECU) according to an operating condition sensed by a vehicle speed sensor, a torque angle sensor, a torque sensor, and the like.

The motor includes a rotor and a stator. A coil is wound around the stator. A connection end of the coil wound around the stator can be connected to a busbar. The busbar can include a terminal connected to the connection end of the coil. The terminal of the busbar may connect the connection end of the coil wound around the stator and may be connected to a cable assembly body.

The cable assembly body may include a connector, a cable, and a rear holder. The connector is connected to an external power source. The cable includes a connection terminal. The connection terminal of the cable is electrically connected to the connector. A body of the connector has an open back surface so that the connection terminal of the cable can be inserted thereinto. The rear holder serves to cover the open back surface of the body of the connector.

The rear holder includes a cable hole through which the cable passes. The rear holder is coupled to the body of the connector in a state in which the cable passes through the cable hole. In this case, in order to block electromagnetic waves, a tube may be disposed to surround a circumference of the cable. Since an outer diameter of the tube is greater than a diameter of the cable hole of the rear holder, the cable should be installed in the rear holder after the tube is fitted into the cable. That is, the cable should pass through the cable hole of the rear holder in a state in which the tube is installed in the cable. However, a spacing space is necessary between the rear holder and the tube because a facility configured to press the terminal should be located. However, the tube should also be installed at a cable portion located at the spacing space to block the electromagnetic waves. Accordingly, a tube expandable in a sliding shape is installed.

However, the cable assembly body having such a configuration has a problem that an assembly process is inconvenient and manufacturing costs increase. Particularly, reprocessing is difficult when the cable assembly body is misassembled.

Meanwhile, the cable assembly body may include U-phase, V-phase, and W-phase cables. Each of the cables has a core disposed at a center portion thereof. An insulation layer is disposed at the outside of the core and an electromagnetic wave shield layer is disposed at the outside of the insulation layer. The electromagnetic wave shield layer blocks electromagnetic waves generated from the cable.

However, since a shield member forming the electromagnetic wave shield layer is expensive, manufacturing costs of the motor increase.

DISCLOSURE

Technical Problem

The present invention is directed to providing a rear holder of which an assembly process is simplified and manufacturing costs are reduced and a motor including the same.

Further, the present invention is directed to providing a rear holder capable of inhibiting generation of a gap between a cable hole and a cable and a motor including the same.

In addition, the present invention is directed to providing a rear holder capable of shielding electromagnetic waves from a cable and reducing manufacturing costs and a motor including the same.

Problems desired to be solved by the present invention are not limited to the above-described problems, and other problems not mentioned above may be apparently understood by those skilled in the art from below.

Technical Solution

One aspect of the present invention provides a rear holder including a body part including a cable hole and a rib configured to protrude from the body part, wherein the body part includes a first body and a second body. The first body includes a first groove, the second body includes a second groove, the first body and the second body are coupled to each other so that the first groove and the second groove are aligned to form the cable hole, and the rib extends from at least one of the first groove and the second groove.

The first body may include a first coupling portion and the second body may include a second coupling portion coupled to the first coupling portion.

A lower surface of the first body and a lower surface of the second body may come into contact with each other, the first coupling portion may be disposed in a lower surface of the first body, and the second coupling portion may be disposed in a lower surface of the second body.

The first coupling portion may include a first protrusion and a first hole, the second coupling portion may include a second protrusion and a second hole, the first protrusion and the second hole may be coupled to each other, and the first hole and the second protrusion may be coupled to each other.

Each of the first protrusion and the second protrusion may have a hook shape, and each of the first hole and the second hole may include an engaging surface with which the first protrusion or the second protrusion is engaged.

The first protrusion may include a pair of first hook pins spaced apart from and facing each other, and the second protrusion may include a pair of second hook pins spaced apart from and facing each other.

The first body may include a third coupling portion, and the second body may include a fourth coupling portion coupled to the third coupling portion.

The third coupling portion may include a third protrusion and a third hole, the fourth coupling portion may include a fourth protrusion and a fourth hole, the third protrusion and the fourth hole may be coupled to each other, and the third hole and the fourth protrusion may be coupled to each other.

The first groove may pass through a front surface and a back surface of the first body, the second groove may pass through a front surface and a back surface of the second body, and the rib may protrude from the front surface of the first body.

The rib may protrude from the front surface of the second body.

The rib may have a cylindrical shape.

Another aspect of the present invention provides a cable assembly body including a connector, a cable including a connection terminal connected to the connector, and a rear holder coupled to a back surface of the connector, wherein the rear holder includes a body part including a cable hole through which the cable passes, the body part includes a first body and a second body, the first body includes a first groove, the second body includes a second groove, the first body and the second body are coupled to each other so that the first groove and the second groove are aligned to form the cable hole, and a rib configured to extend from at least one of the first groove and the second groove and protrude from the body part is included, and the rib comes into contact with the connection terminal of the cable which passes through the cable hole.

The connection terminal may include a fixing part configured to surround an outer circumferential surface of the cable and the rib may come into contact with the fixing part.

Each of the fixing part and the rib may have a cylindrical shape.

The rib may have an inner diameter smaller than an outer diameter of the fixing part.

Still another aspect of the present invention provides a motor including a rotary shaft, a rotor configured to surround the rotary shaft, and a stator disposed at the outside of the rotor, wherein the stator includes a coil and a cable assembly body connected to the coil, the cable assembly body includes a connector, a cable including a connection terminal connected to the connector, and a rear holder coupled to a back surface of the connector. The rear holder includes a body part including a cable hole through which the cable passes, the body part includes a first body and a second body, the first body includes a first groove, the second body includes a second groove, the first body and the second body are coupled to each other so that the first groove and the second groove are aligned to form the cable hole, and a rib configured to extend from at least one of the first groove and the second groove and protrude from the body part is included, and the rib comes into contact with the connection terminal of the cable which passes through the cable hole.

Yet another aspect of the present invention provides a rear holder including a first body including a first groove, a second body including a second groove, and a coupling portion configured to couple the first body and the second body so that the first groove and the second groove are aligned to form a cable hole, wherein at least one of the first groove and the second groove includes a protruding rib therein.

The rib may be disposed along a width direction of the first groove.

The rib may be disposed adjacent to at least one of an inlet and an outlet of the first groove.

The rib may be disposed along a width direction of the second groove.

The rib may be disposed adjacent to at least one of an inlet and an outlet of the second groove.

The rib may include an area having a thickness variable on the basis of a longitudinal direction of the first groove.

An upper surface of the rib may be disposed to be inclined along the longitudinal direction of the first groove.

The rib may have a thickness which increases from the inlet of the first groove to the outlet of the first groove.

The rib may include an area having a thickness variable on the basis of a longitudinal direction of the second groove.

An upper surface of the rib may be disposed to be inclined along the longitudinal direction of the second groove.

The rib may have a thickness which increases from the inlet of the second groove to the outlet of the second groove.

A lower surface of the first body and an upper surface of the second body may come into contact with each other, and the coupling portion may be disposed in at least one of the lower surface of the first body and the upper surface of the second body.

The coupling portion may include a first protrusion and a first hole disposed in the first body and a second protrusion and a second hole disposed in the second body, wherein the first protrusion is coupled to the second hole, and the second protrusion is coupled to the first hole.

Each of the first protrusion and the second protrusion may have a hook shape, and each of the first hole and the second hole may include an engaging surface with which the first protrusion or the second protrusion is engaged.

The first protrusion and the second protrusion may be formed of a pair of hook pins spaced apart from and facing each other.

Yet another aspect of the present invention provides a cable assembly body including a connector, a cable including a connection terminal connected to the connector, and a rear holder coupled to a back surface of the connector, wherein the rear holder includes a first body including a first groove, a second body including a second groove, and a coupling portion configured to couple the first body and the second body so that the first groove and the second groove are aligned to form a cable hole, and at least one of the first groove and the second groove includes a protruding rib therein.

Yet another aspect of the present invention provides a motor including a rotary shaft, a rotor including a hole in which the rotary shaft is disposed, a stator disposed at the outside of the rotor, and a cable assembly body connected to a coil of the stator, wherein the cable assembly body includes a connector, a cable including a connection terminal connected to the connector, and a rear holder coupled to a back surface of the connector. The rear holder includes a first body including a first groove, a second body including a second groove, and a coupling portion configured to couple the first body and the second body so that the first groove and the second groove are aligned to form a cable hole, and at least one of the first groove and the second groove may include a protruding rib therein.

Yet another aspect of the present invention provides a motor including a rotary shaft, a rotor including a hole in which the rotary shaft is disposed, a stator disposed at the outside of the rotor, a housing configured to accommodate the rotor and the stator, a connector electrically connected to the stator, and a plurality of cables disposed between the stator and the connector, wherein the plurality of cables include a first cable including an electromagnetic wave shield layer and a second cable not including the electromagnetic wave shield layer.

The first cable may be one and the second cable may be multiple.

The plurality of second cables may be two and the first cable may be disposed between the two second cables.

The motor may further include a grommet, wherein the grommet may include a first hole through which the first cable passes and a second hole through which the second cable passes, and the first hole may have a diameter greater than that of the second hole.

The first cable may further include a copper wire, a first insulator, and a second insulator, wherein the copper wire, the first insulator, the electromagnetic wave shield layer, and the second insulator may have the same center, the copper wire may have an outer diameter smaller than an outer diameter of the first insulator, the first insulator may have the outer diameter smaller than an outer diameter of the electromagnetic wave shield layer, and the electromagnetic wave shield layer may have the outer diameter smaller than an outer diameter of the second insulator.

The second cable may include a copper wire and an insulator, the copper wire and the insulator may have the same center, and the copper wire may have an outer diameter smaller than an outer diameter of the insulator.

The motor may further include the grommet and a ground terminal disposed in the grommet to come into contact with the electromagnetic wave shield layer of the first cable may be included The motor may further include a bracket disposed at an upper side of the housing, and the ground terminal may come into contact with the bracket.

The stator may include a stator core and a coil wound around the stator core, wherein the coil may be connected to a terminal, and the terminal may be electrically connected to the cable.

The motor may further include the grommet, the cable disposed to pass through the grommet may be connected to a connection terminal, and the connection terminal may be connected to the terminal.

Advantageous Effects

According to an embodiment, reprocessing is easy when misassembly occurs due to a body part separated into a first body and a second body coupled to each other to form a cable hole.

According to the embodiment, since a cable assembly body can be assembled after a pressing process of a terminal of a motor and thus securing a spacing space between a tube configured to surround a cable and a rear holder is not necessary, a process can be simplified and manufacturing costs can be reduced.

According to the embodiment, generation of a gap between the cable hole and the cable can be inhibited by disposing a rib on grooves forming the cable hole.

According to the embodiment, since the first body and the second body forming the cable hole are separately formed and a coupling portion configured to couple the first body and the second body is provided, the reprocessing is easy when the misassembly occurs.

According to the embodiment, since the cable assembly body can be assembled after the pressing process of the terminal of the motor and thus securing the spacing space between the tube configured to surround the cable and the rear holder is not necessary, the process can be simplified and the manufacturing costs can be reduced.

According to the embodiment, the manufacturing costs are reduced by configuring only a part of a cable of a wire assembly body as a cable including a shield layer.

DESCRIPTION OF DRAWINGS

FIG. 10 is a view illustrating a rib.

MODES OF THE INVENTION

Hereinafter, embodiments of the present invention will be described in detail with reference to the accompanying drawings. Purposes, particular advantages, and new characteristic of the present invention may become more apparent from the following detailed description related to the accompanying drawings and the embodiment. Further, terms and words used in the specification and the claims should not interpreted with a usual or dictionary meaning and should be interpreted with a meaning and concepts which coincide with technical spirit of the present invention on the basis of a principle in which an inventor may appropriately define the concepts of the terms to describe the invention thereof in an optimal method. In addition, while describing the present invention, a detailed description for a related technology which may unnecessarily obscure the spirit of the present invention will be omitted.

Further, it should be understood that, although the terms "second," "first," and the like may be used herein to describe various elements, the elements are not limited by the terms. The terms are only used to distinguish one element from another. For example, a first element could be termed a second element, and similarly, a second element could be termed a first element without departing from the scope of the present invention. The term "and/or" includes combinations of one or all of a plurality of associated listed items.

Figure 1:
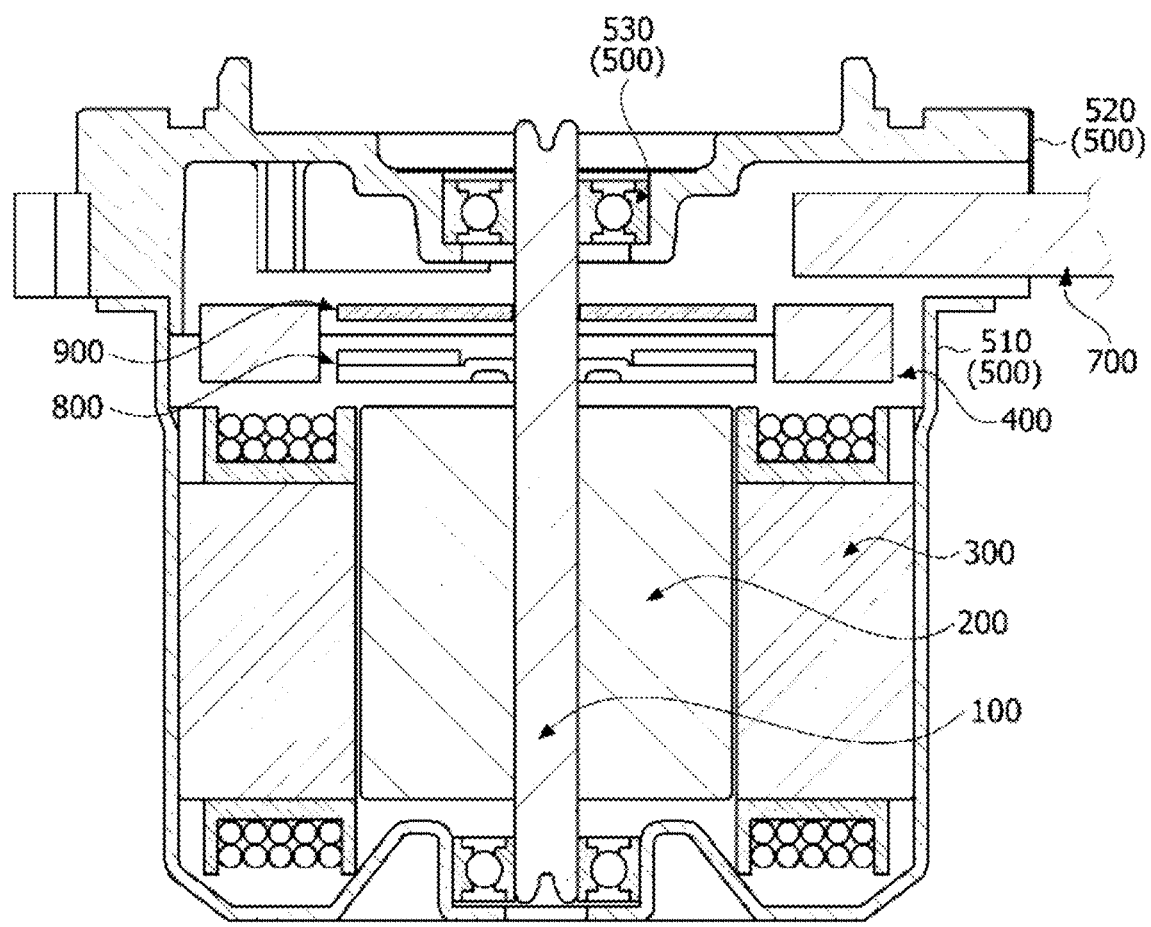
FIG. 1 is a side-sectional view of a motor according to an embodiment.
Figure 2:
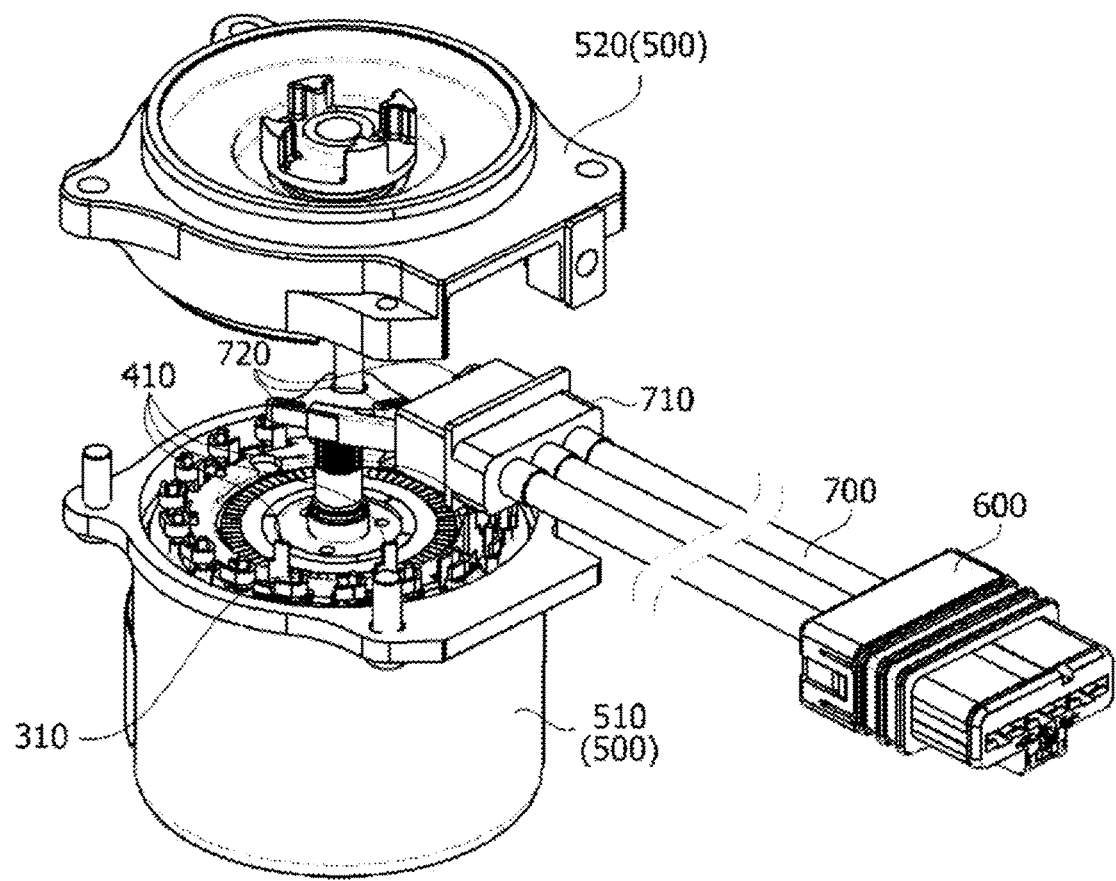
FIG. 2 is an exploded view of the motor shown in FIG. 1.

FIG. 1 is a side-sectional view of a motor according to an embodiment, and FIG. 2 is an exploded view of the motor shown in FIG. 1.

Referring to FIGS. 1 and 2, the motor according to the embodiment may include a rotary shaft 100, a rotor 200, a stator 300, a busbar 400, a housing 500, a connector 600, and a cable 700.

The rotary shaft 100 may be coupled to the rotor 200. When an electromagnetic interaction between the rotor 200 and the stator 300 occurs through current supply, the rotor 200 rotates, and accordingly, the rotary shaft 100 rotates. The rotary shaft 100 may be connected to a steering shaft of a vehicle to transfer power to the steering shaft.

The rotor 200 rotates through an electric interaction with the stator 300.

The rotor 200 may include a rotor core and a magnet. The rotor core may be embodied in a shape in which a plurality of plates each having a thin and circular steel sheet shape are stacked or disposed in one barrel shape. A hole to which the rotary shaft 100 is coupled may be disposed at a center of the rotor core. A protrusion configured to guide the magnet may protrude from an outer circumferential surface of the rotor core. The magnet may be attached to the outer circumferential surface of the rotor core. A plurality of magnets may be disposed along an edge of the rotor core at regular intervals. The rotor 200 may include a can member configured to surround and fix the magnets so that the magnets are not separated from the rotor core and configured to inhibit exposure of the magnets.

A coil may be wound around the stator 300 to cause the electric interaction between the stator 300 and the rotor 200. A specific configuration of the stator 300 to wound the coil will be described below. The stator 300 may include a stator core including a plurality of teeth. The stator core may be provided with a ring-shaped yoke and the teeth in which the coil is wound around the yoke in a direction toward a center. The teeth may be provided along an outer circumferential surface of the yoke at regular intervals. Meanwhile, the stator core may be formed by stacking a plurality of plates each having a thin steel sheet shape. Further, the stator core may be formed by coupling or connecting a plurality of divided cores to each other.

The busbar 400 may be disposed on the stator 300. The busbar 400 may include a terminal in a ring-shaped molding member. Further, the terminal of the busbar 400 may include U-phase, V-phase, and W-phase terminals (410 in FIG. 2).

The coil (310 in FIG. 2) wound around the stator 300 is connected to the U-phase, V-phase, and W-phase terminals (410 in FIG. 2). Further, the terminals (410 in FIG. 2) are electrically connected to the cable 700.

The housing 500 may accommodate the rotor 200 and the stator 300 therein. The housing 500 may include a body 510 and a bracket 520. The body 510 has a cylindrical shape. The body 510 may be formed of a metal material such as aluminum. Further, an upper portion of the body 510 is open. The bracket 520 covers the open upper portion of the body 510. The stator 300 may be located in the body 510 and the rotor 200 may be disposed in the stator 300. A bearing 530 may be disposed at a center of the bracket 520. The bearing 530 may be double-injection molded and integrated with the bracket 520.

The connector 600 is connected to an external power source.

The cable 700 is connected to the connector 600. Further, the cable 700 is electrically connected to the stator 300. A grommet 710 is disposed at end portions of the cable 700. The end portions of the cable 700 may be accommodated in the grommet 710. The grommet 710 is formed of an elastically transformable material. The grommet 710 is disposed between the body 510 and the bracket 520 to inhibit introduction of foreign matters into the motor.

In the cable 700, three cables supplying U-phase, V-phase, and W-phase power may be disposed. Each of the end portions of the cable 700 is connected to connection terminals (720 in FIG. 2). The connection terminals 720 are connected to the terminals (410 in FIG. 2). In this case, the terminals 410 are connected to the coil 310 of the stator 300.

A sensing magnet 800 is a device coupled to the rotary shaft 100 to be linked with the rotor 200 and configured to detect a location of the rotor 200.

A sensor configured to sense a magnetic force of the sensing magnet 800 may be disposed on a printed circuit board 900. In this case, the sensor may be a Hall integrated circuit (IC). The sensor senses changes of an N-pole and an S-pole in the sensing magnet 800 to generate sensing signals.

Figure 3:
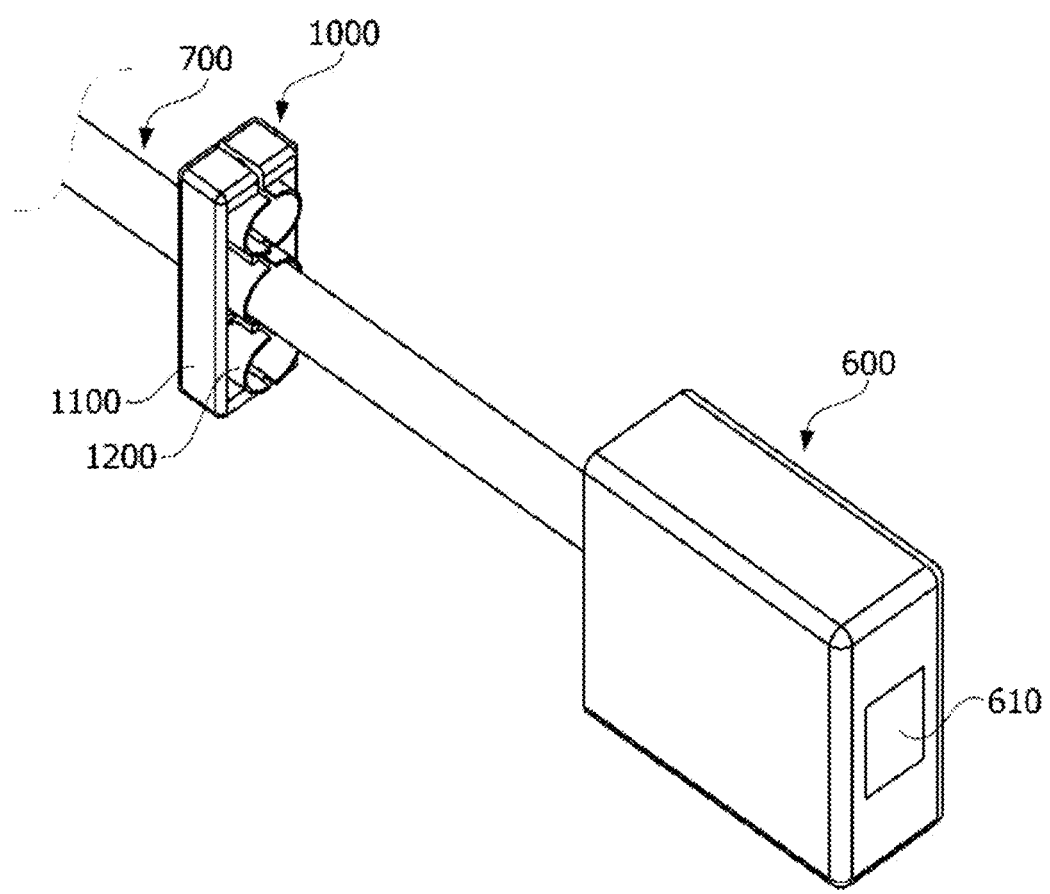
FIG. 3 is a view illustrating a cable assembly body according to the embodiment.

FIG. 3 is a view illustrating a cable assembly body according to the embodiment.

Referring to FIG. 3, the cable assembly body may include a rear holder 1000, the connector 600, and the cable 700.

The rear holder 1000 covers an open back surface of the connector 600. Further, the cable 700 passes through the rear holder 1000. A connection terminal 610 is installed at an end of the cable 700. Terminals electrically connected to the connector of the motor are disposed in the connector 600. The back surface of the connector 600 is open so that the connection terminal 610 of the cable 700 may be inserted. A body of the connector 600 is physically coupled to the connector of the motor.

Figure 4:
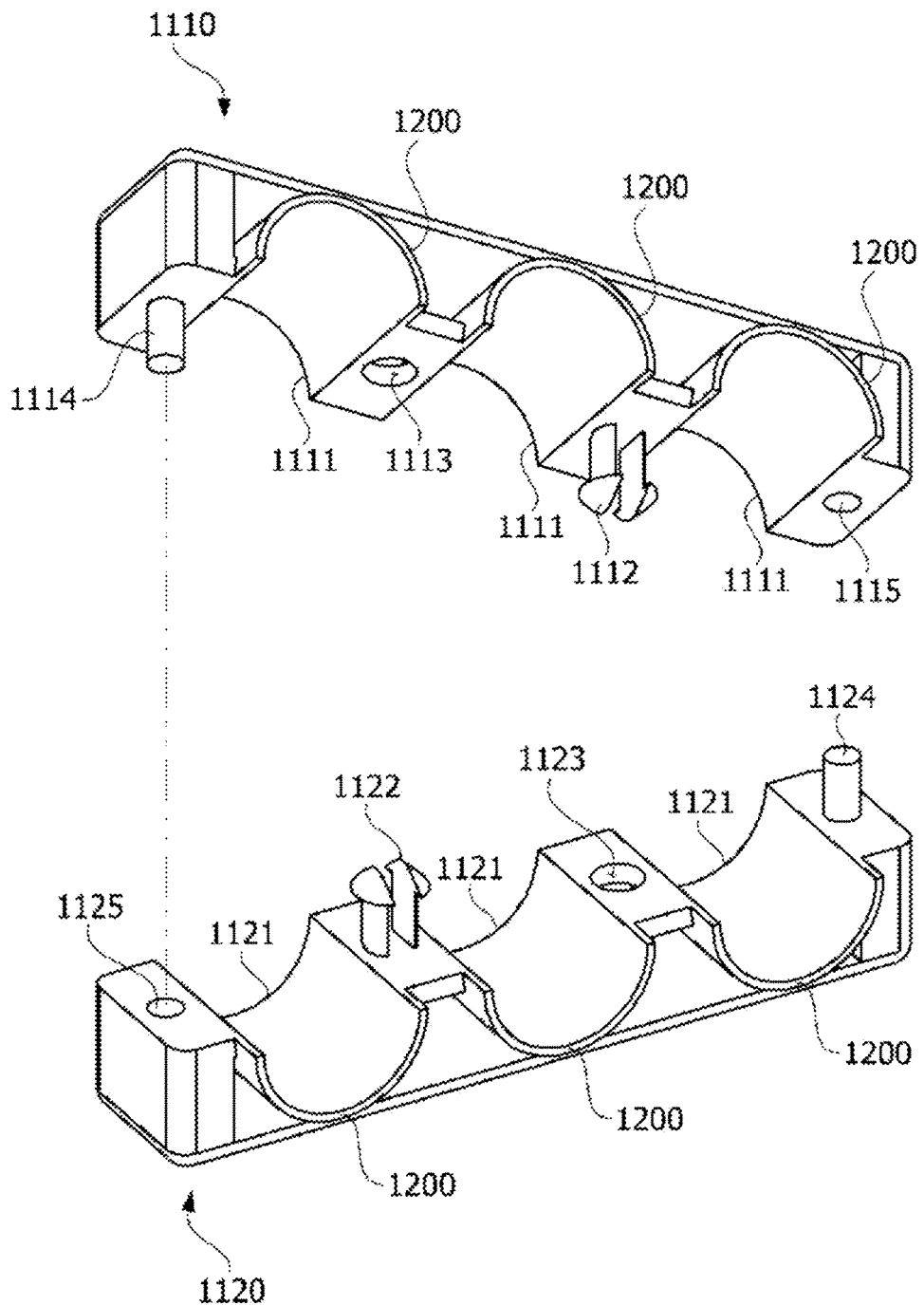
FIG. 4 is a view illustrating a rear holder.

FIG. 4 is a view illustrating the rear holder.

Referring to FIG. 4, the rear holder 1000 may include a body part 1100 and ribs 1200.

The body part 1100 may be formed of two separable parts. The rear holder 1000 may include a first body 1110 and a second body 1120. The first body 1110 includes a first coupling portion, and the second body 1120 includes a second coupling portion. Since the first coupling portion and the second coupling portion are coupled to each other, the first body 1110 and the second body 1120 are coupled to each other. Further, the first body 1110 includes a third coupling portion and the second body 1120 includes a fourth coupling portion. Since the third coupling portion and the fourth coupling portion are coupled to each other, the first body 1110 and the second body 1120 are coupled to each other.

Figure 5:
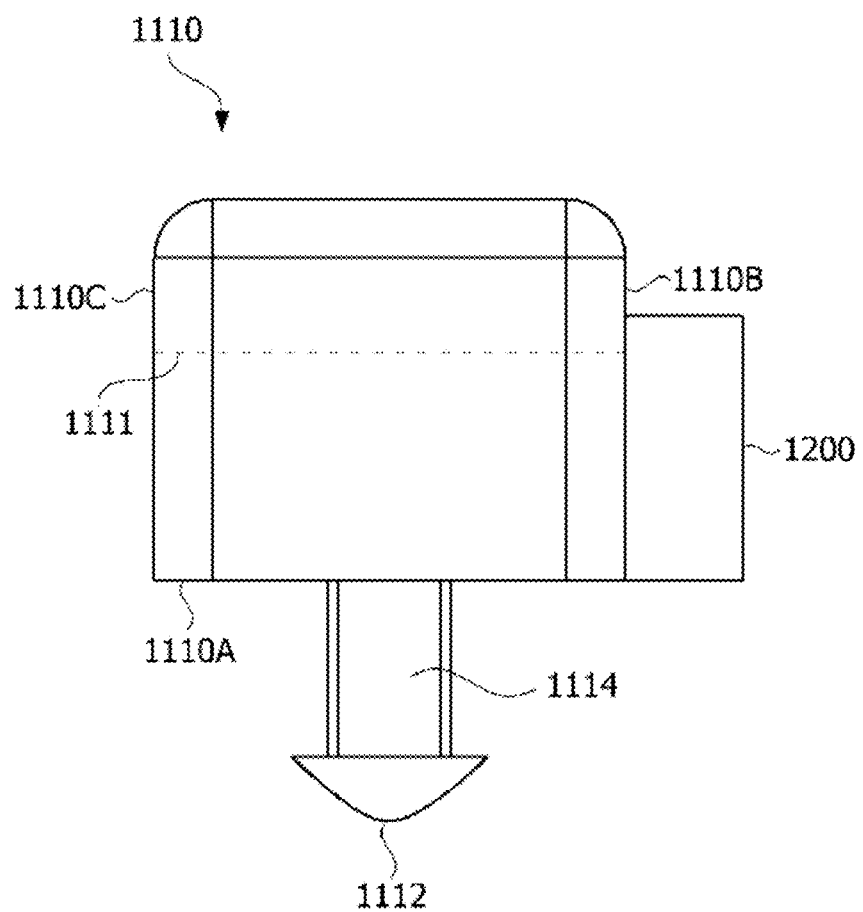
FIG. 5 is a side view of a first body.

FIG. 5 is a side view of the first body.

Referring to FIGS. 4 and 5, the first body 1110 may have a hexahedron shape. The first body 1110 may include a lower surface 1110A, a front surface 1110B, and a back surface 1110C. The first body 1110 may include a first groove 1111. The first groove 1111 is formed to pass through the front surface 1110B and the back surface 1110C. The first groove 1111 may have a semi-cylindrical shape. The first groove 1111 is a place through which the cable 700 passes.

The first body 1110 may include the first coupling portion and the third coupling portion.

The first coupling portion may include a first protrusion 1112 and a first hole 1113.

The first protrusion 1112 and the first hole 1113 may be formed at the lower surface 1110A of the first body 1110. The first protrusion 1112 may protrude from the lower surface 1110A and have a hook shape. For example, the first protrusion 1112 may be a pair of hook pins spaced apart from and facing each other. The above is a configuration which elastically transforms easily when the first protrusion 1112 is coupled to the second hole 1123 of the second body 1120 and increases a fixing force after the first protrusion 1112 is coupled to the second hole 1123 of the second body 1120.

A second protrusion 1122 of the second body 1120 is coupled to the first hole 1113. The first hole 1113 may include an engaging surface with which the second protrusion 1122 of the second body 1120 having a hook shape is engaged.

The third coupling portion may include a third protrusion 1114 and a third hole 1115.

The first protrusion 1112 and the first hole 1113 may be relatively disposed at a center of the first body 1110. On the other hand, the third protrusion 1114 and the third hole 1115 may be disposed at the outside of the first body 1110.

The third protrusion 1114 and the third hole 1115 may be formed at the lower surface 1110A of the first body 1110. The third protrusion 1114 may be disposed on an end of one side of the lower surface 1110A, and the third hole 1115 may be disposed in an end of the other side of the lower surface 1110A.

The third protrusion 1114 may protrude from the lower surface 1110A and have a pin shape. The third protrusion 1114 is coupled to the third hole 1115. The first protrusion 1112 and the first hole 1113 may serve to strongly couple the first body 1110 and the second body 1120, and the third protrusion 1114 and the third hole 1115 may serve to align the first body 1110 and the second body 1120.

Figure 6:
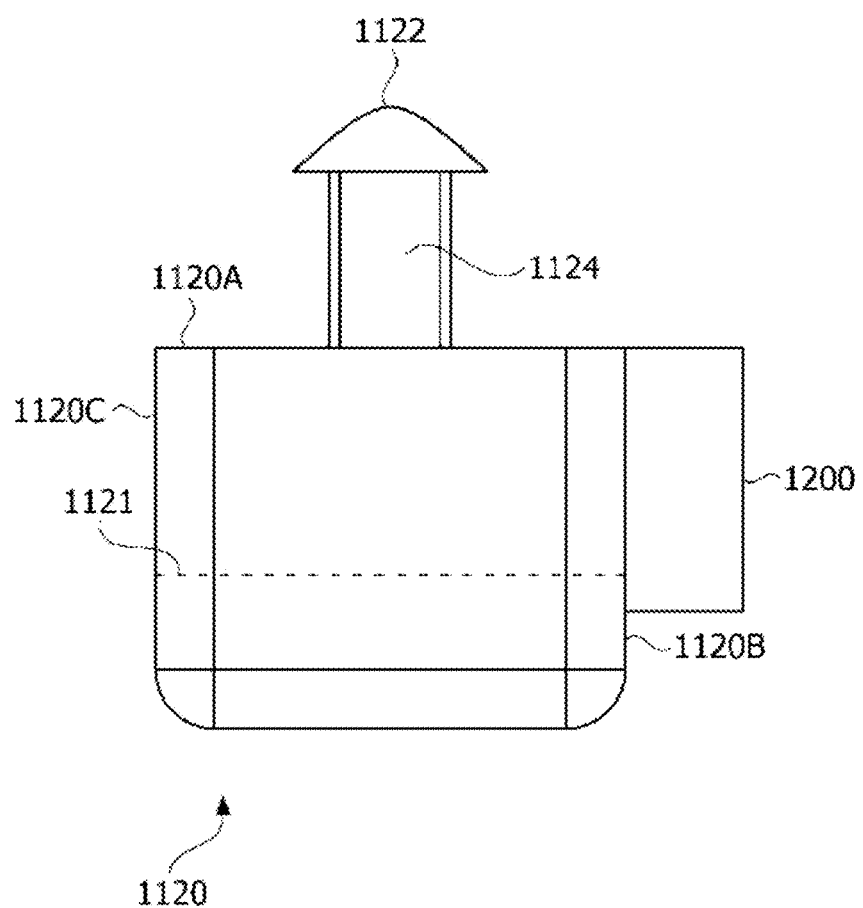
FIG. 6 is a side view of a second body.

FIG. 6 is a side view of the second body.

Referring to FIGS. 4 and 6, the second body 1120 and the first body 1110 may have the same shape and size. In the description of the embodiment, although the first body 1110 and the second body 1120 are separated, the first body 1110 and the second body 1120 may have the same shape and size and thus may be a single component which may be coupled.

The second body 1120 may also have a hexahedron shape. The second body 1120 may include a lower surface 1120A, a front surface 1120B, and a back surface 1120C. The second body 1120 may include a second groove 1121. The second groove 1121 is formed to pass through the front surface 1120B and the back surface 1120C. The second groove 1121 may have a semi-cylindrical shape. The second groove 1121 is a place through which the cable 700 passes.

The second body 1120 may include the second coupling portion and the fourth coupling portion.

The second coupling portion may include a second protrusion 1122 and a second hole 1123.

The second protrusion 1122 and the second hole 1123 may be formed at the lower surface 1120A of the second body 1120. The second protrusion 1122 may protrude from the lower surface 1120A and have a hook shape. For example, the second protrusion 1122 may be a pair of hook pins spaced apart from and facing each other. The above is a configuration which elastically transforms easily when the second protrusion 1122 is coupled to the first hole 1113 of the first body 1110 and increases a fixing force after the second protrusion 1122 is coupled to the first hole 1113 of the first body 1110

The first protrusion 1112 of the first body 1110 is coupled to the second hole 1123. The first hole 1113 may include an engaging surface with which the first protrusion 1112 having the hook shape is engaged.

The fourth coupling portion may include a fourth protrusion 1124 and a fourth hole 1125.

The second protrusion 1122 and the second hole 1123 may be relatively disposed at a center of the second body 1120. On the other hand, the fourth protrusion 1124 and the fourth hole 1125 may be disposed at the outside of the second body 1120.

The fourth protrusion 1124 and the fourth hole 1125 may be formed at the lower surface 1120A of the second body 1120. The fourth protrusion 1124 may be disposed on an end of one side of the lower surface 1120A, and the fourth hole 1125 may be disposed in an end of the other side of the lower surface 1120A.

The fourth protrusion 1124 may protrude from the lower surface 1120A and have a pin shape. The fourth protrusion 1124 is coupled to the fourth hole 1125.

The second protrusion 1122 and the second hole 1123 may serve to strongly couple the first body 1110 and the second body 1120, and the fourth protrusion 1124 and the fourth hole 1125 may serve to align the first body 1110 and the second body 1120.

Meanwhile, when the first body 1110 and the second body 1120 are coupled to each other by the above-described first to fourth coupling portions, the lower surface 1110A of the first body 1110 and the lower surface 1110A of the second body 1120 come into contact with each other. Further, when the first body 1110 and the second body 1120 are coupled to each other, the first groove 1111 of the first body 1110 and the second groove 1121 form a cable hole through which the cable 700 passes.

As described above, since the first body 1110 and the second body 1120 are coupled to implement the cable hole, reprocessing may be easy and there is an advantage of being able to finally switch to the assembly process of the cable assembly 10 when misassembly occurs.

The ribs 1200 may be disposed to extend from the first groove 1111 and the second groove 1121 forming the cable hole. The ribs 1200 may protrude from a boundary between the front surface 1110B of the first body 1110 and the first groove 1111. Further, the ribs 1200 may protrude from a boundary between the front surface 1120B of the second body 1120 and the second groove 1121. The ribs 1200 may each have a cylindrical shape in a state in which the first body 1110 and the second body 1120 are coupled to each other.

Figure 7:
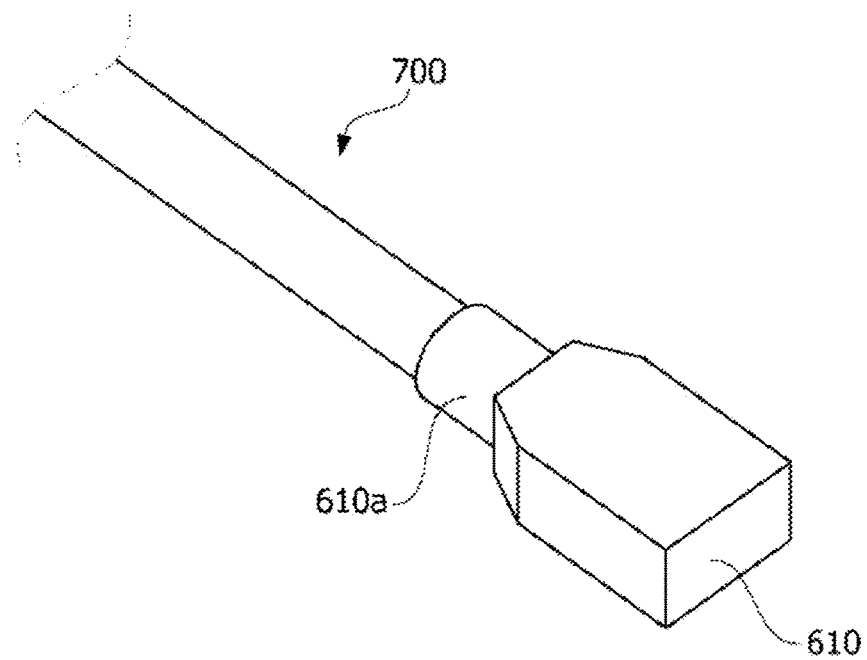
FIG. 7 is a view illustrating a cable and a connection terminal.

FIG. 7 is a view illustrating a cable and a connection terminal.

Referring to FIG. 7, the connection terminal 610 may be installed at the end of the cable 700. The connection terminal 610 is connected to a terminal included in the connector 600. The connection terminal 610 may include a fixing part 610a configured to surround and fix an outer circumferential surface of the cable 700. The fixing part 610a may have a cylindrical shape.

Figure 8:
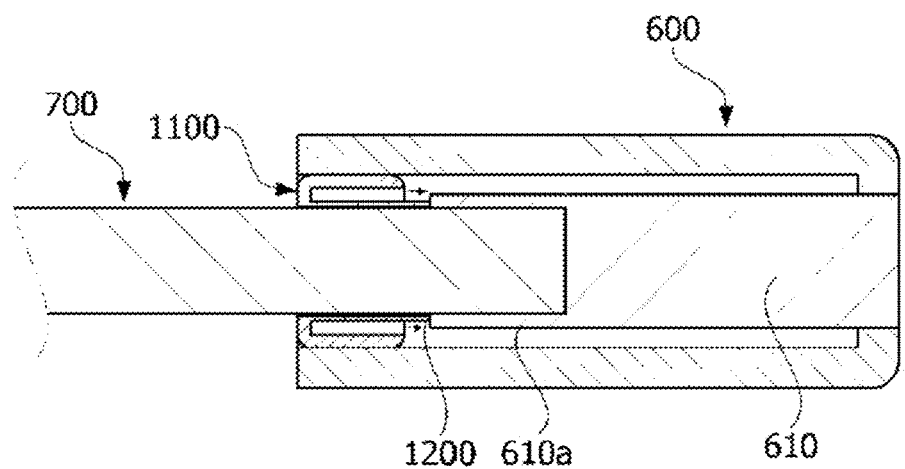
FIG. 8 is a view illustrating the inside of a connector.

FIG. 8 is a view illustrating the inside of the connector.

Referring to FIG. 8, the ribs 1200 come into contact with the fixing part 610a. When the rear holder 1000 is fixed to the connector 600, the ribs 1200 push the fixing part 610a so that the connection terminal 610 of the cable 700 and the terminal included in the connector 600 come into close contact with each other.

The ribs 1200 may fundamentally inhibit a defect which may occur when the connection terminal 610 of the cable 700 and the terminal included in the connector 600 do not come into contact with each other during a process of assembling the rear holders 1000.

Figure 9:
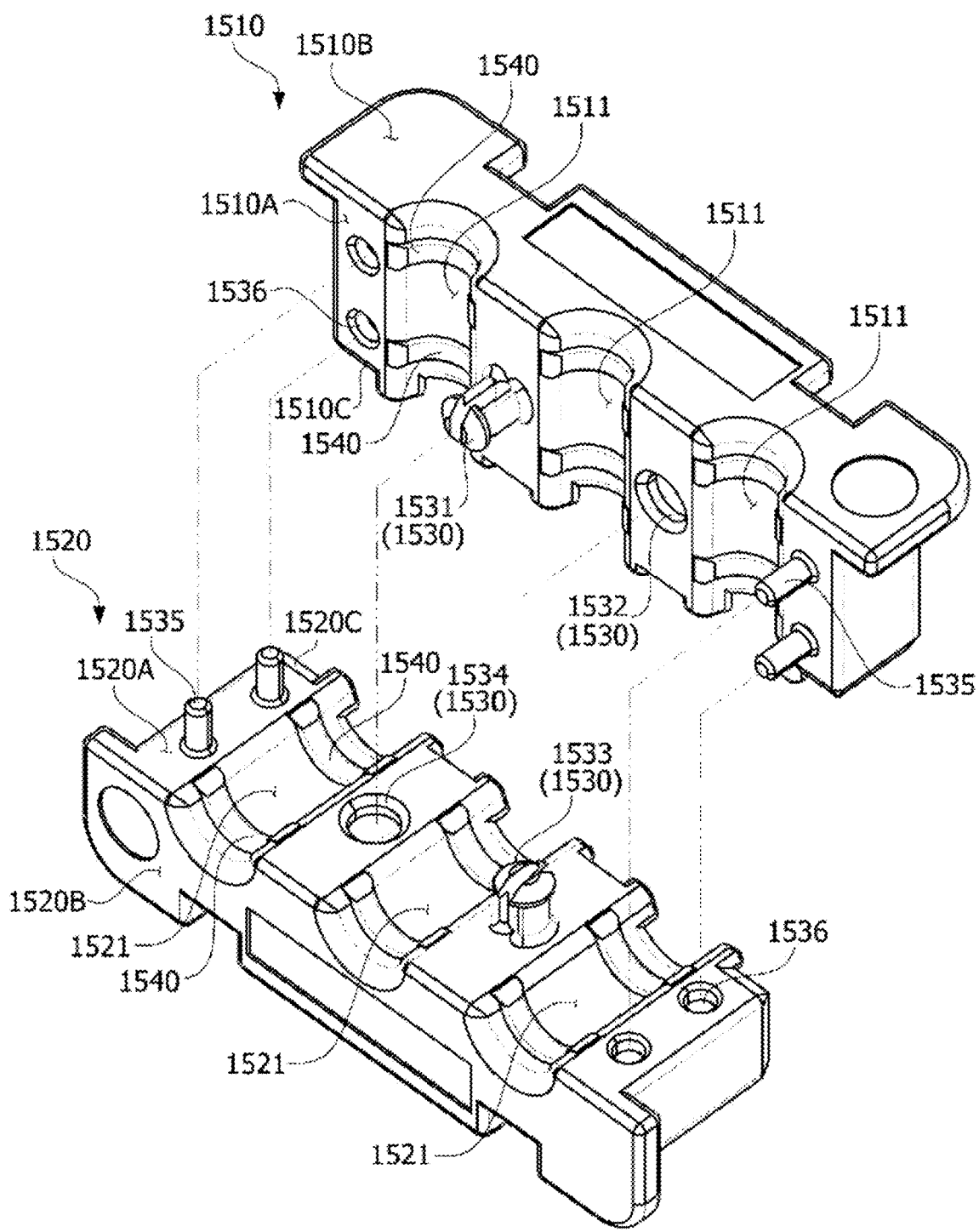
FIG. 9 is a view illustrating a modification of the rear holder.

FIG. 9 is a view illustrating a modification of the rear holder.

Referring to FIG. 9, a rear holder 1500 according to the modification may include a first body 1510, a second body 1520, and a coupling portion 1530.

The first body 1510 and the second body 1520 are coupled to each other through the coupling portion 1530.

The first body 1510 may have a hexahedron shape. The first body 1510 may include a lower surface 1510A, a front surface 1510B, and a back surface 1510C. The first body 1510 may include a first groove 1511. The first groove 1511 is formed to pass through the front surface 1510B and the back surface 1510C. The first groove 1511 may have a semi-cylindrical shape. The first groove 1511 is a place through which the cable 700 passes. A plurality of first grooves 1511 may be disposed.

The second body 1520 may have a hexahedron shape. The second body 1520 may include an upper surface 1520A, a front surface 1520B, and a back surface 1520C. The second body 1520 may include a second groove 1521. The second groove 1521 is formed to pass through the front surface 1520B and the back surface 1520C. The second groove 1521 may have a semi-cylindrical shape. The second groove 1521 is a place through which the cable 700 passes. A plurality of second grooves 1521 may be disposed.

Although the first body 1510 and the second body 1520 are separately described, the first body 1510 and the second body 1520 may have the same shape and size and thus may be a single component which may be coupled. When the first body 1510 and the second body 1520 are coupled to each other, the lower surface 1510A of the first body 1510 and the upper surface 1520A of the second body 1520 come into contact with each other and the first groove 1511 and the second groove 1521 are aligned to form the cable hole through which the cable 700 passes.

The first body 1510 and the second body 1520 are coupled to each other through the coupling portion 1530.

The coupling portion 1530 may include a first protrusion 1531, a first hole 1532, a second protrusion 1533, and a second hole 1534.

The first protrusion 1531 and the first hole 1532 may be disposed at the first body 1510. Further, the second protrusion 1533 and the second hole 1534 may be disposed at the second body 1520.

The first protrusion 1531 and the first hole 1532 may be formed at the lower surface 1510A of the first body 1510. The first protrusion 1531 may protrude from the lower surface 1510A and have a hook shape. For example, the first protrusion 1531 may be a pair of hook pins spaced apart from and facing each other. The above is a configuration which elastically transforms easily when the first protrusion 1531 is coupled to the second hole 1534 of the second body 1520 and increases a fixing force after the first protrusion 1531 is coupled to the second hole 1534 of the second body 1520.

The second protrusion 1533 of the second body 1520 is coupled to the first hole 1532. When the second protrusion 1533 having a hook shape is inserted into the first hole 1532, the second protrusion 1533 is engaged with an engaging surface formed as an inner wall of the first hole 1532 and is not dislocated.

The second protrusion 1533 and the second hole 1534 may be formed at the upper surface 1520A of the second body 1520. The second protrusion 1533 may protrude from the upper surface 1520A and have a hook shape. For example, the second protrusion 1533 may be a pair of hook pins spaced apart and facing each other. The above is a configuration which elastically transforms easily when the second protrusion 1533 is coupled to the first hole 1532 of the first body 1510 and increases a fixing force after the second protrusion 1533 is coupled to the first hole 1532 of the first body 1510.

The first protrusion 1531 of the first body 1510 is coupled to the second hole 1534. When the first protrusion 1531 having a hook shape is inserted into the second hole 1534, the first protrusion 1531 is engaged with an engaging surface formed as an inner wall of the second hole 1534 and is not dislocated.

Meanwhile, each of the first body 1510 and the second body 1520 may include a hole 1536 and a pin 1535. The pin 1535 of first body 1510 protrudes from the lower surface 1510A and is inserted into the hole 1536 of the second body 1520.

The pin 1535 of the second body 1520 may protrude from the upper surface 1520A and be inserted into the hole 1536 of the first body 1510. A plurality of pins 1535 and a plurality of holes 1536 may be disposed.

FIG. 10 is a view illustrating the rib.

Referring to FIGS. 9 and 10, ribs 1540 may be disposed at each of the first groove 1511 and the second groove 1521.

The ribs 1540 protrude from the surface of the first groove 1511. The ribs 1540 may be disposed along a width direction of the first groove 1511. Each of the ribs 1540 may have an arch-shaped protruding structure formed along the surface of the first groove 1511. The ribs 1540 may be disposed adjacent to an inlet E and an outlet O of the first groove 1511. A side surface 1541 of the rib 1540 may be a curved surface. An upper surface 1542 of the rib 1540 may be a flat surface. The upper surface 1542 of the rib 1540 comes into contact with the cable 700.

The ribs 1540 protrude from the surface of the second groove 1521. The ribs 1540 may be disposed along a width direction of the second groove 1521. Each of the ribs 1540 may have an arch-shaped protruding structure formed along the surface of the second groove 1521. The ribs 1540 may be disposed adjacent to an inlet E and an outlet O of the second groove 1521.

Referring to FIG. 4, the ribs 1540 come into contact with the cable 700 in a state in which the first body 1510 and the second body 1520 are coupled to each other. However, the first groove 1511 and the second groove 1521 maintain a state of being spaced apart from the cable 700. Since the ribs 1540 come into contact with the cable 700 at the inlet E and the outlet O of each of the first groove 1511 and the second groove 1521, introduction of foreign matters between the cable and the first groove 1511 or the second groove 1521 may be inhibited. Further, an occurrence of vibrations due to a gap between the cable and the first groove 1511 or the second groove 1521 may be inhibited.

Figure 11:
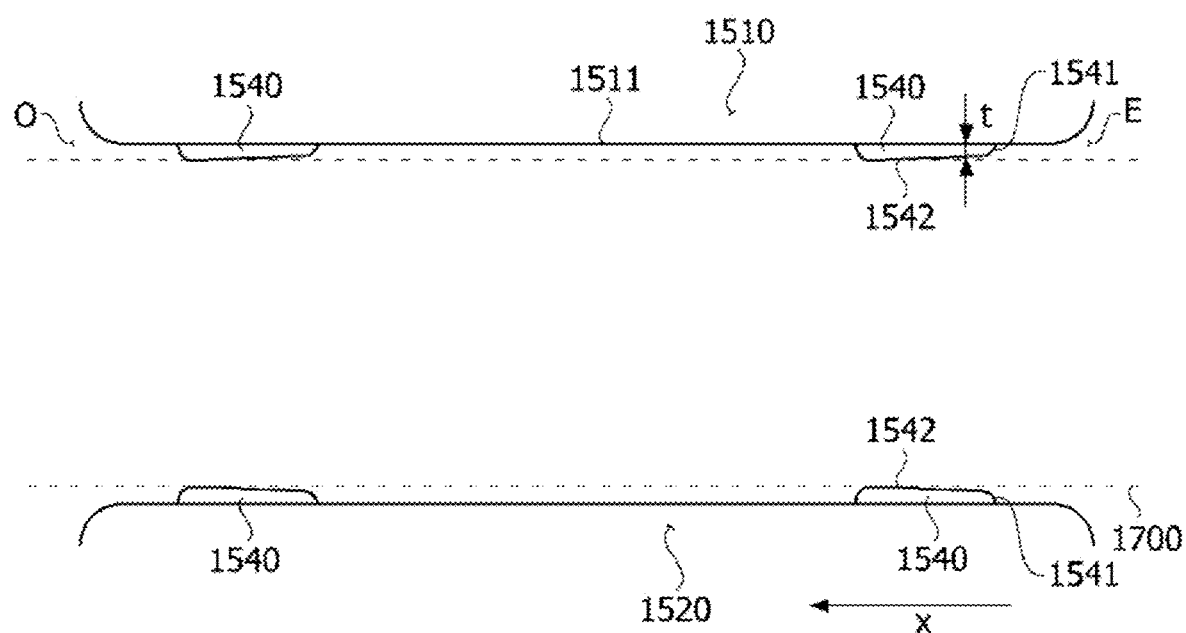
FIG. 11 is a view illustrating an inclined rib.

FIG. 11 is a view illustrating an inclined rib.

Referring to FIG. 11, the rib 1540 may include an area having a thickness t variable on the basis of a longitudinal direction (an x direction in FIG. 11) of the first groove 1511 or a longitudinal direction (the x direction in FIG. 11) of the second groove 1521. For example, the thickness t may be formed to increase from the inlet E to the outlet O. Accordingly, the upper surface 1542 of the rib 1540 is disposed to be inclined.

The rear holder 1500 moves toward the connector 600 to be coupled to the connector 600 in a state in which the cable 700 passes through the cable hole. In this case, the cable 700 relatively moves from the inlet E toward the outlet O. Accordingly, an inclined upper surface 541 of the rib 1540 improves contact with the outer circumferential surface of the cable 700. Accordingly, generation of a gap between the rib 1540 and the cable 700 may be inhibited.

Figure 12:
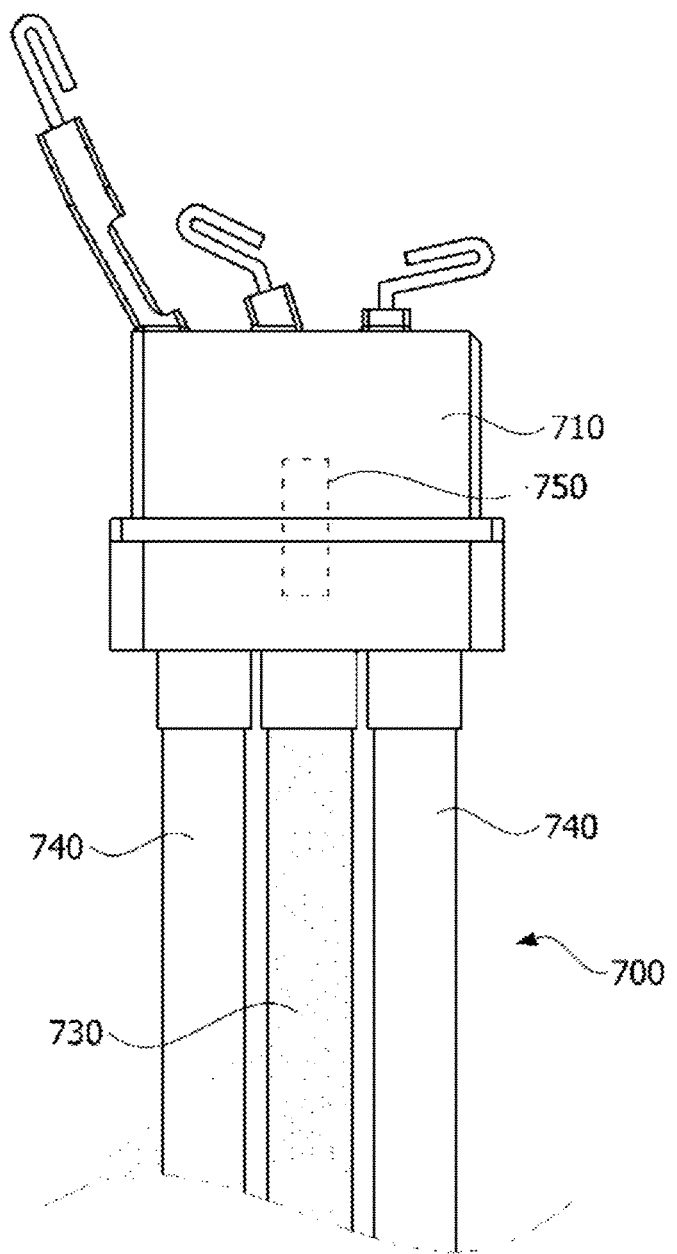
FIG. 12 is a view illustrating the arrangement of the cable.

FIG. 12 is a view illustrating the arrangement of the cable.

Referring to FIG. 12, in the cable 700, the three cables supplying U-phase, V-phase, and W-phase power are disposed. The cable 700 may include an electromagnetic wave shield layer. The electromagnetic wave shield layer is provided to block influence of an electric field or a magnetic field and may be formed of a copper wire woven in a net shape.

In this case, some of the three cables 700 may be a first cable 730 including the electromagnetic wave shield layer, and the remaining cables 700 may be a second cable 740 not including the electromagnetic wave shield layer. In the motor according to the embodiment, only some of the three cables 700 are constituted by a first cable 730 not including the electromagnetic wave shield layer to reduce manufacturing costs.

For example, as shown in FIG. 3, the cables 700 may be formed of one first cable 730 and two second cables 740. In this case, the second cables 740 may be disposed at both sides of the first cable 730. Accordingly, the first cable 730 is disposed between the two second cables 740. The arrangement configuration of the cables 700 is provided to improve electromagnetic wave shielding efficiency. The electromagnetic wave shield layer of the first cable 730 absorbs electromagnetic waves generated from the second cables 740 adjacent thereto. Accordingly, the electromagnetic wave shielding efficiency may be advantageously improved by closely disposing the first cable 730 and the second cables 740. When the first cable 730 is disposed between the two second cables 740, since both second cables 740 are disposed closest to the first cable 730, the electromagnetic waves generated from the two second cables 740 may be efficiently absorbed.

Figure 13:
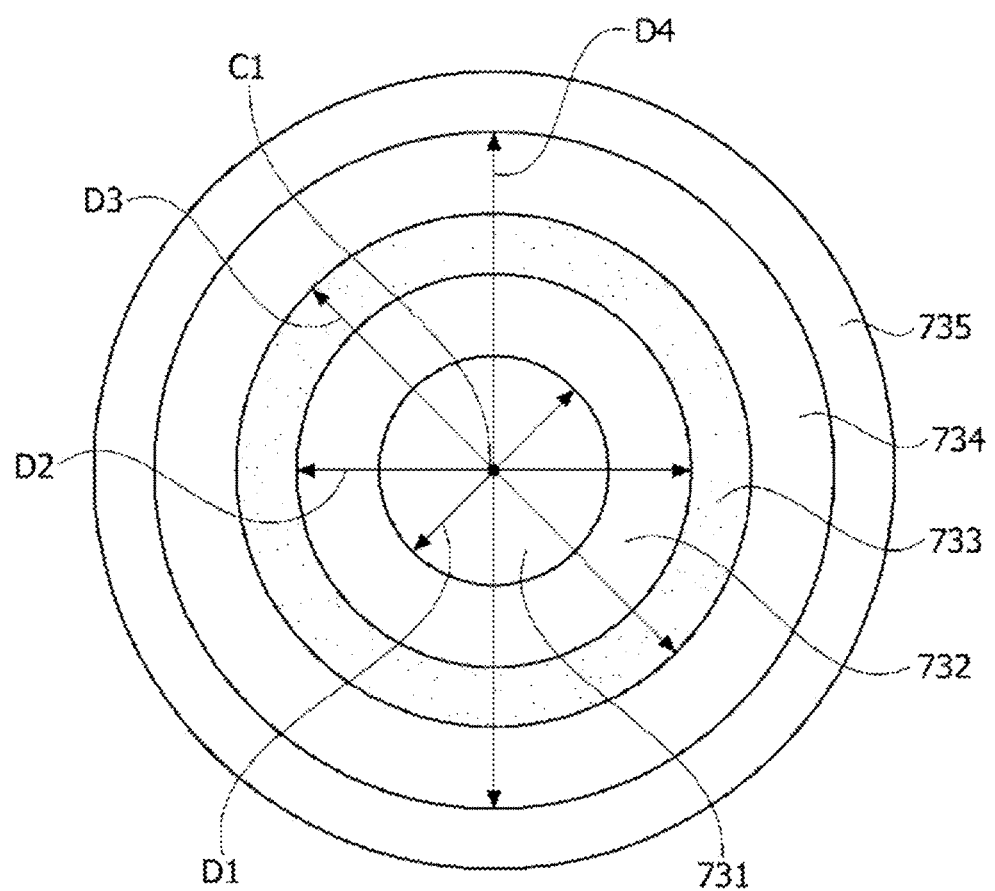
FIG. 13 is a view illustrating a cross section of a first cable.

FIG. 13 is a view illustrating a cross section of a first cable.

Referring to FIG. 13, the first cable 730 includes a copper wire 731, a first insulator 732, an electromagnetic wave shield layer 733, a second insulator 734, and a sheath layer 735.

The copper wire 731 is a metal part provided so that currents flow.

The first insulator 732 covers the copper wire 731 to allow the copper wire 731 to withstand an operating voltage and fixes the copper wire 731. The first insulator 732 is disposed at the outside of the copper wire 731. Accordingly, on the basis of a concentric center C1, an outer diameter D1 of the copper wire 731 is smaller than an outer diameter D2 of the first insulator 732.

The electromagnetic wave shield layer 733 is disposed at the outside of the first insulator 732. Accordingly, the outer diameter D2 of the first insulator 732 is smaller than an outer diameter D3 of the electromagnetic wave shield layer 733.

The second insulator 734 covers the electromagnetic wave shield layer 733 to fix the electromagnetic wave shield layer 733. The second insulator 734 is disposed at the outside of the electromagnetic wave shield layer 733. Accordingly, an outer diameter D3 of the electromagnetic wave shield layer 733 is smaller than an outer diameter D4 of the second insulator 734.

The sheath layer 735 is disposed at the outside of the second insulator 734. A front end portion of the first cable 730 may be disposed in the grommet 710 so that the sheath layer 735 and the second insulator 734 may be peeled and the electromagnetic wave shield layer 733 may be exposed. The exposed electromagnetic wave shield layer 733 comes into contact with the ground terminal (750 in FIG. 3). The ground terminal 750 may come into contact with the bracket 520 in a process of mounting the grommet 710.

Figure 14:
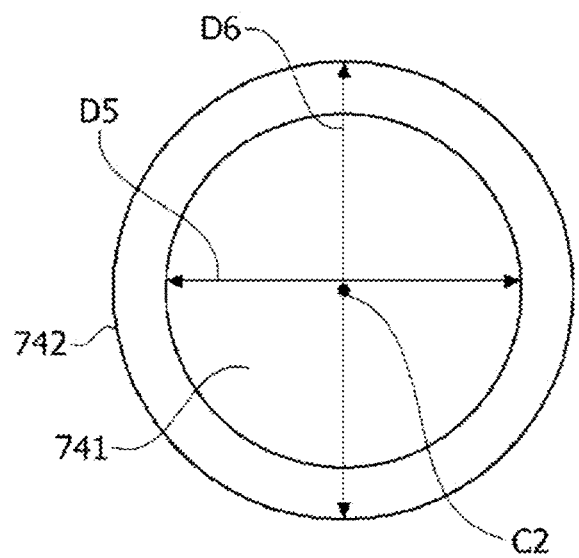
FIG. 14 is a view illustrating a cross section of a second cable.

FIG. 14 is a view illustrating a cross section of a second cable.

Referring to FIG. 14, the second cable 740 may include a copper wire 741 and a third insulator 742. The second cable 740 does not include the electromagnetic wave shield layer. The third insulator 742 is disposed at the outside of the copper wire 741. Accordingly, on the basis of a concentric center C2, an outer diameter D5 of the copper wire 741 is smaller than an outer diameter D6 of the third insulator 742.

Figure 15:
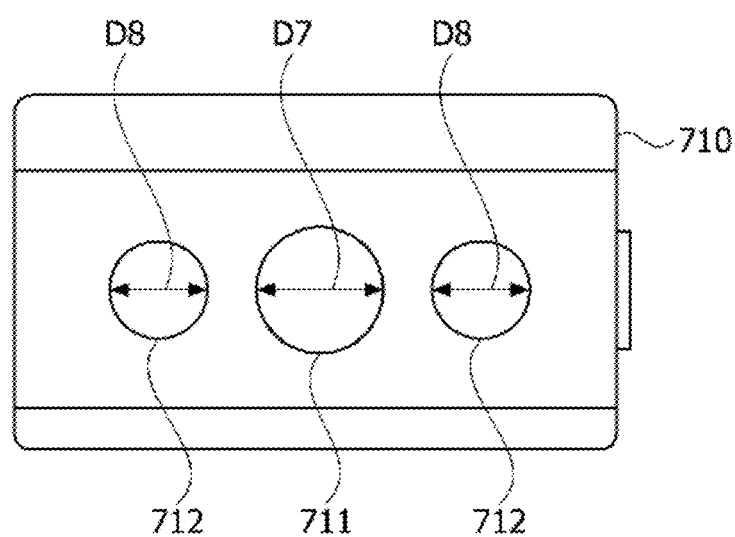
FIG. 15 is a view illustrating holes of a grommet.

FIG. 15 is a view illustrating holes of the grommet.

Referring to FIG. 15, the grommet 710 may include a first hole 711 and second holes 712. The first cable 730 passes through the first hole 711. Further, the second cables 740 pass through the second holes 712. In this case, the outer diameter of the first cable 730 may be greater than the outer diameter of the second cable 740 because the first cable 730 includes the electromagnetic wave shield layer 733 unlike the second cables 740. Accordingly, a diameter D7 of the first hole 711 through which the first cable 730 passes is greater than a diameter D8 of the second hole 712 through which the second cable 740 passes. Further, the first hole 711 may be disposed between two second holes 712 corresponding to locations of the first cable 730 and the second cables 740.

Figure 16:
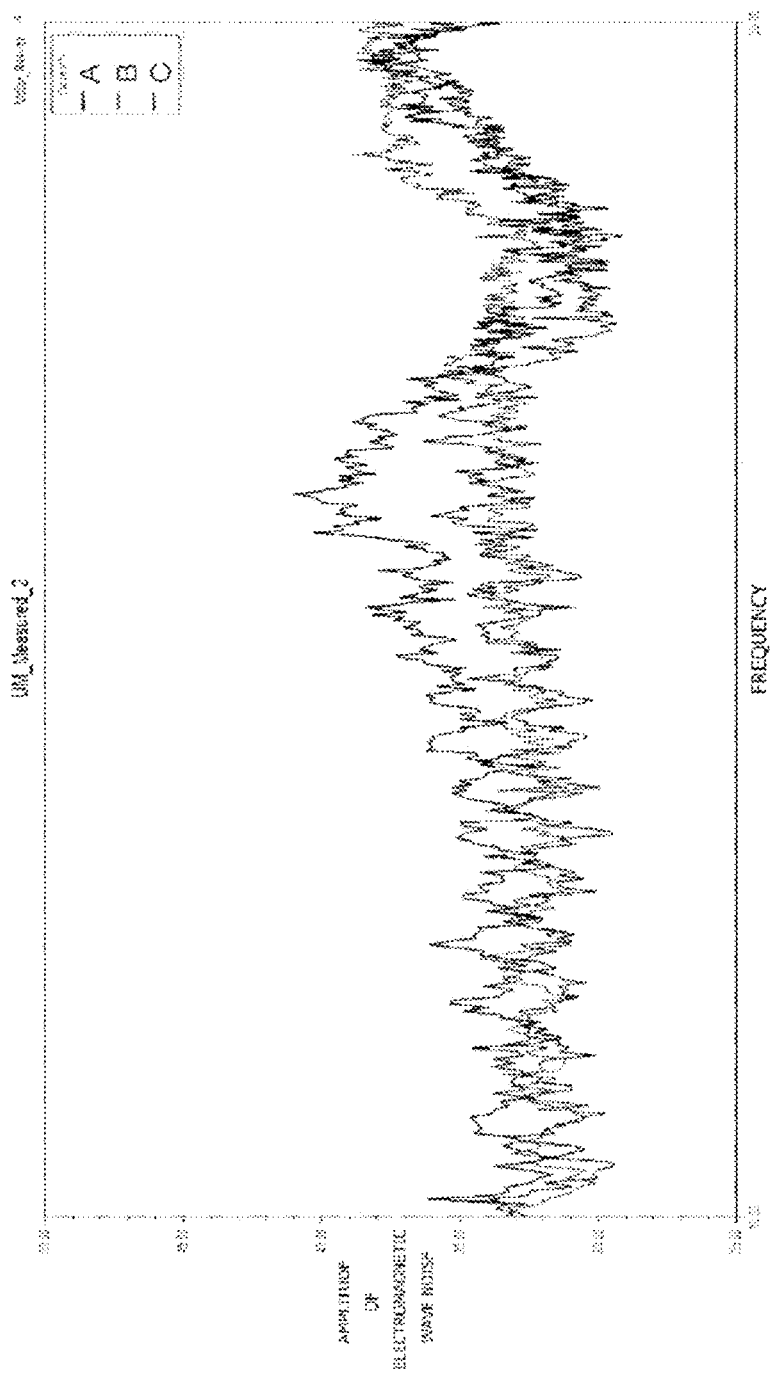
FIG. 16 is a graph in which shielding effects of electromagnetic waves are compared.

FIG. 16 is a graph in which shielding effects of the electromagnetic waves are compared.

A in FIG. 16 shows amplitude of the electromagnetic wave noise in a motor in which only the second cables 740 not including the electromagnetic wave shield layer are disposed. Further, B in FIG. 16 shows amplitude of the electromagnetic wave noise in a motor in which only the first cable 730 including the electromagnetic wave shield layer is disposed.

As shown in FIG. 16, the amplitude of the electromagnetic wave noise of the motor in which only the second cables 740 are disposed is measured to be undoubtedly greater than the amplitude of the electromagnetic wave noise in the motor in which only the first cable 730 is disposed.

C in FIG. 16 shows amplitude of the electromagnetic wave noise in a motor in which one first cable 730 and two second cables 740 are mixed and disposed. Even in the case of the motor in which the first cable 730 and the second cables 740 are mixed and disposed, since the amplitude of the electromagnetic wave noise is shown to be smaller than the amplitude of the electromagnetic wave noise of the motor in which only the second cables 740 are disposed, it may be confirmed that there is the electromagnetic wave shielding effect.

Particularly, as shown in FIG. 16, the amplitude of the electromagnetic wave noise in the motor in which the first cable 730 and the second cables 740 are mixed and disposed and the amplitude of the electromagnetic wave noise in the motor in which only the first cable 730 including the electromagnetic wave shield layer is disposed may be confirmed to be almost the same in all frequency bands. That is, it may be confirmed that the electromagnetic wave shielding effect does not differ when a case in which the electromagnetic wave shield layer is disposed in each of the three cables 700 and a case in which the electromagnetic wave shield layer is disposed in only one cable 700 are compared.

Accordingly, manufacturing costs may be reduced and electromagnetic wave shielding performance may be secured by configuring only one of the three cables 700 as the cable including the electromagnetic wave shield layer.

As described above, the motor according to one embodiment of the present invention has been examined with reference to the accompanying drawings.

The above description is only an exemplary description of the technical spirit of the present invention, and various changes, various modifications, changes, and substitutions of the present invention may be performed by those skilled in the art within essential characteristics of the embodiments. Accordingly, the disclosed embodiments and the accompanying drawings of the present invention are not for limiting but for describing the technical spirit of the present invention, and the scope of the technical spirit of the present invention is not limited by the embodiments and the accompanying drawings. The scope of the present invention should be interpreted by the claims which will be described below, and the equivalents should be interpreted as being included in the claims of the present invention.

The invention claimed is:

1. A motor comprising:
a rotary shaft;
a rotor including a hole in which the rotary shaft is disposed;
a stator disposed at the outside of the rotor; and
a cable assembly body connected to a coil of the stator,
wherein the cable assembly body includes a connector, a cable including a connection terminal connected to the connector, and a rear holder coupled to a back surface of the connector;
wherein the rear holder includes a first body including a first groove, a second body including a second groove, a coupling portion configured to couple the first body and the second body so that the first groove and the second groove are aligned to form a cable hole, and a rib, wherein the rib is disposed to protrude along at least one of a boundary between a front surface of the first body and the first groove and a boundary between a front surface of the second body and the second groove;
wherein the connection terminal includes a fixing part configured to surround and fix an outer circumferential surface of the cable,
wherein the rib comes into contact with the fixing part.

2. The motor of claim 1, wherein:
the coupling portion includes a first coupling portion and a second coupling portion coupled to each other;
the first coupling portion is disposed in the first body; and
the second coupling portion is disposed in the second body.

3. The motor of claim 1, wherein:
the first groove is disposed to pass through the front surface and a back surface of the first body; and
the second groove is disposed to pass through the front surface and a back surface of the second body.

4. A rear holder comprising:
a first body including a first groove;
a second body including a second groove; and
a coupling portion configured to couple the first body and the second body so that the first groove and the second groove are aligned to form a cable hole,
wherein at least one of the first groove and the second groove includes a protruding rib therein,
wherein the rib is disposed along a width direction of the first groove and is disposed adjacent to at least one of an inlet and an outlet of the first groove, and includes an area having a thickness variable on the basis of a longitudinal direction of the first groove.

5. The rear holder of claim 4, wherein an upper surface of the rib is disposed to be inclined along the longitudinal direction of the first groove.

6. The rear holder of claim 4, wherein a second rib is disposed along a width direction of the second groove and disposed adjacent to at least one of an inlet and an outlet of the second groove, and includes an area having a thickness variable on the basis of a longitudinal direction of the second groove.

7. The rear holder of claim 6, wherein an upper surface of each rib is disposed to be inclined along a longitudinal direction of the first groove or the second groove.

8. The rear holder of claim 6, wherein the thickness of each rib is formed to increase from the inlet to the outlet of the first groove or from an inlet to an outlet of the second groove.

9. The motor of claim 1,
wherein the plurality of cables include a first cable including an electromagnetic wave shield layer and a second cable not including the electromagnetic wave shield layer.

10. The motor of claim 9, wherein:
the first cable is one; and
the second cable is a plurality of second cables.

11. The motor of claim 10, wherein:
the plurality of second cables are two; and
the first cable is disposed between the two second cables.

12. The motor of claim 9, further comprising a grommet,
wherein the grommet includes a first hole through which the first cable passes and a second hole through which the second cable passes,
wherein the first hole has a diameter greater than that of the second hole.

* * * * *